United States Patent
Molnar et al.

(10) Patent No.: US 6,686,012 B1
(45) Date of Patent: Feb. 3, 2004

(54) MULTI-LAYER ARTICLES INCLUDING A FLUOROPLASTIC LAYER

(75) Inventors: Attila Molnar, Vadnais Heights, MN (US); Edward E. Parsonage, St. Paul, MN (US); Denis D. Duchesne, Woodbury, MN (US); Tatsuo Fukushi, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 167 days.

(21) Appl. No.: 09/644,771

(22) Filed: Aug. 23, 2000

(51) Int. Cl.[7] ............... B32B 1/08; B32B 25/08; B32B 27/08; B32B 27/28; B32B 27/32

(52) U.S. Cl. ............... 428/36.91; 428/411.1; 428/421; 428/423.1; 428/474.4; 428/413; 428/521; 428/522; 428/523

(58) Field of Search ............... 428/36.91, 411.1, 428/421, 423.1, 474.4, 413, 521, 522, 523

(56) References Cited

U.S. PATENT DOCUMENTS

| | | | |
|---|---|---|---|
| 4,330,017 A | * 5/1982 | Satoh et al. ............... 138/126 |
| 4,338,237 A | 7/1982 | Sulzbach et al. ............ 524/777 |
| 5,055,539 A | 10/1991 | Hengel et al. .............. 526/254 |
| 5,320,888 A | * 6/1994 | Stevens .................. 428/36.2 |
| 5,506,281 A | 4/1996 | Mühlbauer ................ 523/201 |
| 5,552,199 A | 9/1996 | Blong et al. .............. 428/36.9 |
| 5,663,255 A | 9/1997 | Anolick et al. ............ 526/254 |
| 5,798,158 A | 8/1998 | Koike et al. .............. 428/36.9 |
| 5,827,587 A | * 10/1998 | Fukushi .................. 428/36.6 |
| 5,941,286 A | 8/1999 | Fauble et al. .............. 138/137 |
| 6,057,014 A | * 5/2000 | Fuller .................... 428/34.1 |
| 6,242,548 B1 | * 6/2001 | Duchesne et al. ........... 526/255 |
| 6,310,141 B1 | * 10/2001 | Chen et al. ............... 525/199 |

FOREIGN PATENT DOCUMENTS

| BE | 844 965 | 2/1977 |
|---|---|---|
| EP | 1 039 199 A2 | 9/2000 |

OTHER PUBLICATIONS

F. W. Billmeyer, *Textbook of Polymer Science*, 3d ed., pp. 398–403, John Wiley & Sons, New York (1984).
R. A. Brullo, "Fluoroelastomer Rubber for Automotive Applications", *Automotive Elastomer & Design*, 1985.
R. A. Brullo, "Fluoroelastomer Seal Up Automotive Future", *Materials Engineering*, Oct. 1988.
W. M. Grootaert et al., "Fluorocarbon Elastomers", Kirk–Othmer, *Encyclopedia of Chemical Technology*, vol. 8, pp 990–1005 (4th ed., John Wiley & Sons, 1993).

* cited by examiner

*Primary Examiner*—Ramsey Zacharia
(74) *Attorney, Agent, or Firm*—James V. Lilly; Brian E. Szymanski

(57) ABSTRACT

A multi-layer article featuring a fluoroplastic layer bonded to a non-fluorinated polymer layer in which the fluoroplastic has a melting point of at least 200° C. and contains interpolymerized units of at least TFE and VDF, the amount of VDF being at least 0.1% by weight, but less than than 20% by weight. Also useful are fluoroplastics containing at least TFE and VDF in which the amount of VDF units is between 0.1 and 15% by weight. Such polymers may optionally have melting points greater than 200° C.

37 Claims, 2 Drawing Sheets

MULTI-LAYER ARTICLES INCLUDING A FLUOROPLASTIC LAYER

TECHNICAL FIELD

This invention relates to multi-layer articles in which one of the layers is a fluoroplastic.

BACKGROUND

Fluorine-containing polymers (also known as "fluoropolymers") are a commercially useful class of materials. Fluoropolymers include, for example, crosslinked fluoroelastomers and semi-crystalline or glassy fluoroplastics. Fluoroplastics are generally of high thermal stability and are particularly useful at high temperatures. They may also exhibit extreme toughness and flexibility at very low temperatures. Many of these fluoroplastics are almost totally insoluble in a wide variety of solvents and are generally chemically resistant. Some have extremely low dielectric loss and high dielectric strength, and may have unique non-adhesive and low friction properties. See, e.g., F. W. Billmeyer, *Textbook of Polymer Science*, 3d ed., pp. 398–403, John Wiley & Sons, New York (1984).

Fluoroelastomers, particularly the copolymers of vinylidene fluoride with other ethylenically unsaturated halogenated monomers such as hexafluoropropylene, have particular utility in high temperature applications such as seals, gaskets, and linings. See, e.g., R. A. Brullo, "Fluoroelastomer Rubber for Automotive Applications," *Automotive Elastomer & Design*, June 1985; "Fluoroelastomer Seal Up Automotive Future," *Materials Engineering*, October 1988; and W. M. Grootaert et al., "Fluorocarbon Elastomers," Kirk-Othmer, *Encyclopedia of Chemical Technology*, vol. 8, pp. 990–1005 ($4^{th}$ ed., John Wiley & Sons, 1993).

In the automotive industry, increased concern with evaporative fuel standards has led to the need for fuel system components that have improved barrier properties. This helps reduce the permeation of fuel vapors through automotive elements such as fuel filler lines, fuel supply lines, fuel tanks, and other elements of an automobile fuel system. Multi-layer tubing and other articles containing a fluoropolymer layer have been used in such automotive elements to provide a chemically resistant permeation barrier. For example, multi-layer -articles in which a tetrafluoroethylene-vinylidene fluoride-hexafluoropropylene (TFE-VDF-HFP) fluoroplastic layer is bonded on one face to a relatively thin inner layer made of an elastomer (e.g., a fluoroelastomer or a non-fluorinated elastomer such as nitrile rubber or epichlorohydrin rubber) and on the other face to a relatively thick outer coverstock layer have been used for this purpose.

SUMMARY

The invention relates to the discovery that multi-layer articles featuring a fluoroplastic layer bonded to a non-fluorinated polymer layer exhibit useful properties such as good fuel permeation resistance when the fluoroplastic has a melting point of at least 200° C. and contains interpolymerized units of at least TFE and VDF, and the amount of VDF is at least 0.1% by weight, but less than than 20% by weight. Preferably, the amount of vinylidene fluoride units is at least 3% by weight, more preferably between 3 and 15% by weight, and even more preferably between 10 and 15% by weight. Also useful are fluoroplastics that include at least TFE and VDF units in which the amount of VDF units is between 0.1 and 15% by weight, more preferably between 3 and 15% by weight, and even more preferably between 10 and 15% by weight. Such fluoroplastics may optionally have melting points greater than 200° C. The adhesion between the two layers preferably is at least 5 N/cm, more preferably at least 15 N/cm, measured in accordance with ASTM D 1876 (T-Peel test).

Other monomers that may be interpolymerized with the TFE and VDF monomers include hexafluoropropylene (HFP), olefin monomers, and perfluorinated alkyl or alkoxy vinyl ether monomers (e.g., in an amount ranging from 0.1 to 5% by weight). One useful fluoroplastic includes interpolymerized units derived from 0.1–15% (preferably 10–15%) by weight VDF, 60–85% by weight TFE, and 10–30% by weight HFP. The fluoroplastic may have a multi-modal molecular weight distribution to facilitate processing, or it may have a uni-modal molecular weight distribution.

The non-fluorinated polymer layer may be an elastomer or a thermoplastic polymer. Thermoplastic elastomers may also be used. The multi-layer article may further include a third polymer layer bonded to the first polymer layer such that the first polymer layer is interposed between the second and third polymer layers. Suitable materials for the third polymer layer include elastomers. The elastomers may be fluorinated or non-fluorinated.

Any or all of the layers of the multi-layer article may be electrically conductive. Preferably, however, it is the innermost layer that is electrically conductive, where "innermost" refers to the layer designed to contact, e.g., fuel or other liquid. Thus, for example, in a two-layer construction, it is the fluoroplastic layer that typically is electrically conductive, while in a three-layer construction, where the fluoroplastic layer is interposed between the second and third polymer layers described above, it is the third polymer layer that typically is electrically conductive.

The individual layers of the article may be bonded directly to each other. Alternatively, they may be bonded together by means of a bonding layer such as a polyamine. A particularly useful polyamine for this purpose is polyallylamine having a molecular weight of greater than 1,000.

The multi-layer articles may be provided in a wide variety of shapes, including sheets, films, containers, hoses, tubes, and the like. The articles are especially useful wherever chemical resistance and/or barrier properties are necessary. Examples of specific uses for the articles include their use in rigid and flexible retroreflective sheets, adhesive articles such as adhesive tapes, paint replacement films, drag reduction films, fuel line and filler neck hoses, hydraulic fluid hoses, exhaust handling hoses, fuel tanks, and the like. The articles are also useful in chemical handling and processing applications, and as wire and cable coatings or jackets.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
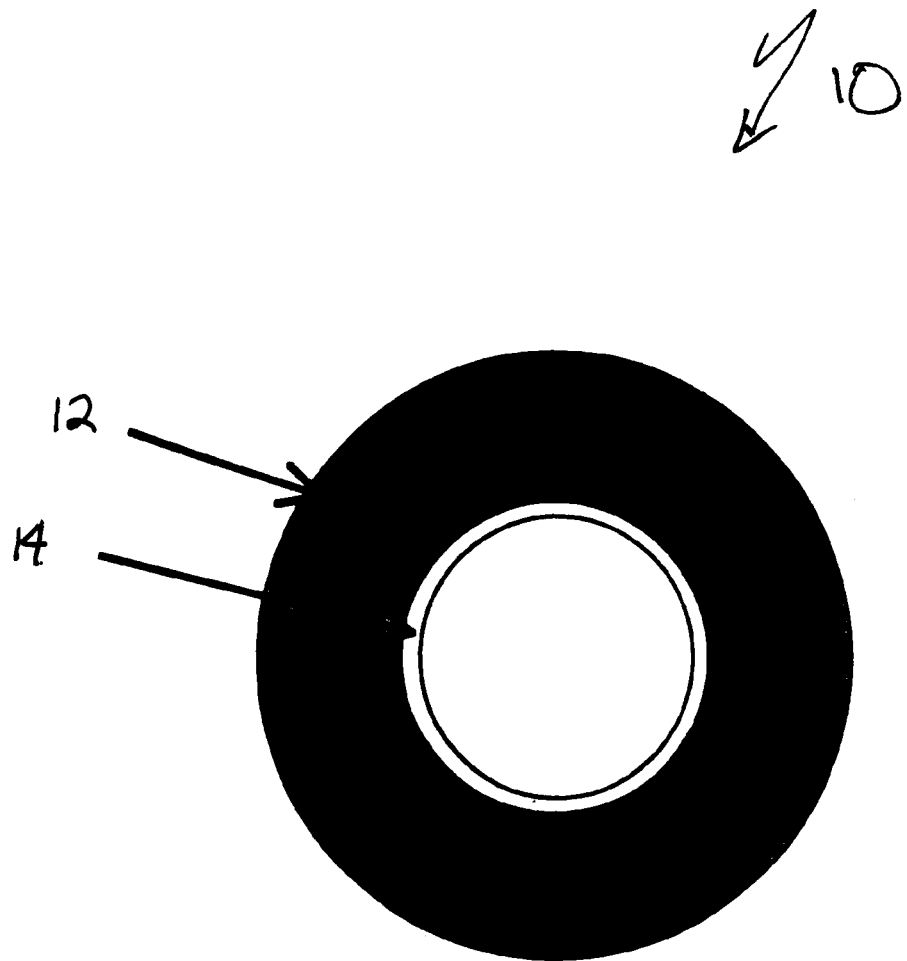
FIGS. 1 and 2 are cross-sectional views of two multi-layer articles according to the invention.

Useful multi-layer laminates include, at a minimum, a fluoroplastic layer bonded on one face to a non-fluorinated polymer layer. The laminate may include other layers as well. For example, the laminate may include a polymer layer bonded to the fluoroplastic layer on the face opposite the face to which the non-fluorinated polymer layer is bonded. This polymer layer may be a fluoropolymer or a non-fluorinated polymer.

The fluoroplastic includes interpolymerized units derived from at least TFE and VDF in which the amount of VDF is at least 0.1% by weight, but less than 20% by weight, and has a melting point of at least 200° C. Preferably, the amount of VDF ranges from 3–15% by weight, more preferably from 10–15% by weight. The fluoropolymer may further include interpolymerized units derived from one or more additional monomers. These monomers may be fluorine-containing monomers such as HFP, chlorotrifluoroethylene (CTFE), 2-chloropentafluoropropene, perfluorinated vinyl ethers (e.g., perfluoroalkoxy vinyl ethers such as $CF_3OCF_2CF_2CF_2OCF=CF_2$ and perfluoroalkyl vinyl ethers such as $CF_3OCF=CF_2$ and $CF_3CF_2CF_2OCF=CF_2$), and fluorine-containing di-olefins such as perfluorodiallyether and perfluoro-1,3-butadiene. They may also be non-fluorine-containing monomers such as olefin monomers (e.g., ethylene, propylene, and the like). A particularly useful fluoroplastic is a TFE-HFP-VDF terpolymer having a melting point greater than 200° C. and between 10 and 15% by weight VDF. The VDF-containing fluoroplastics may be prepared using emulsion polymerization techniques described generally, e.g., in Sulzbach et al., U.S. Pat. No. 4,338,237, hereby incorporated by reference.

The non-fluorinated polymer typically has fewer than 10 mole percent of carbon-bonded fluorine atoms, preferably fewer than 2 mole percent, and more preferably fewer than 1 mole percent. The particular non-fluorinated polymer selected will depend upon the application or desired properties, such as chemical and/or flame resistance, of the multi-layer article. It may be a thermoplastic polymer or an elastomer. Examples of useful thermoplastic polymers include polyamides, polyimides, polyurethanes, polyolefins, polystyrenes, polyesters, polycarbonates, polyketones, polyureas, polyacrylates, and polymethacrylates.

Polyamides useful as the non-fluorinated polymer are generally commercially available. For example, polyamides such as any of the well-known nylons are available from a number of sources. Particularly preferred polyamides are nylon-6, nylon-6,6, nylon-11, and nylon-12. It should be noted that the selection of a particular polyamide material should be based upon the physical requirements of the particular application for the multi-layer article. For example, nylon-6 and nylon-6,6 offer better heat resistance properties than nylon-11 and nylon-12, whereas nylon-11 and nylon-12 offer better chemical resistance properties. In addition, other nylon materials such as nylon-6,12; nylon-6,9; nylon-4; nylon-4,2; nylon-4,6; nylon-7; and nylon-8 may be used, as well as ring-containing polyamides such as nylon-6,T and nylon-6,1. Polyether-containing polyamides, such as PEBAX™ polyamides (Atochem North America, Philadelphia, Pa.), may also be used.

Useful polyurethane polymers include aliphatic, cycloaliphatic, aromatic, and polycyclic polyurethanes. These polyurethanes are typically produced by reaction of a polyfunctional isocyanate with a polyol according to well-known reaction mechanisms. Useful diisocyanates for employment in the production of a polyurethane include dicyclohexylmethane-4,4'-diisocyanate, isophorone diisocyanate, 1,6-hexamethylene diisocyanate, cyclohexyl diisocyanate, and diphenylmethane diisocyanate. Combinations of one or more polyfunctional isocyanates may also be used. Useful polyols include polypentyleneadipate glycol, polytetramethylene ether glycol, polyethylene glycol, polycaprolactone diol, poly-1,2-butylene oxide glycol, and combinations thereof. Chain extenders such as butanediol or hexanediol may also be used in the reaction. Useful commercially available urethane polymers include PN-04 or 3429 from Morton International, Seabrook, N.H. and X-4107 from B.F. Goodrich Co., Cleveland, Ohio.

Useful polyolefin polymers include homopolymers of ethylene, propylene, and the like, as well as copolymers of these monomers with, for example, acrylic monomers and other ethylenically unsaturated monomers such as vinyl acetate and higher alpha-olefins. Such polymers and copolymers can be prepared by conventional free radical polymerization or catalysis of such ethylenically unsaturated monomers. The degree of crystallinity of the polymer can vary. The polymer may, for example, be a semi-crystalline high density polyethylene or may be an elastomeric copolymer of ethylene and propylene. Carboxyl, anhydride, or imide functionalities may be incorporated into the polymer by polymerizing or copolymerizing functional monomers such as acrylic acid or maleic anhydride, or by modifying the polymer after polymerization, e.g., by grafting, by oxidation, or by forming ionomers. Examples include acid modified ethylene acrylate copolymers, anhydride modified ethylene vinyl acetate copolymers, anhydride modified polyethylene polymers, and anhydride modified polypropylene polymers. Such polymers and copolymers generally are commercially available. For example, anhydride modified polyethylene polymers are commercially available from E.I. DuPont de Nemours & Co., Wilmington, Del. under the trade designation BYNEL™ co-extrudable adhesive resins.

Useful polyacrylates and polymethacrylates include polymers of acrylic acid, methyl acrylate, ethyl acrylate, acrylamide, methacrylic acid, methyl methacrylate, ethyl methacrylate, and the like.

Additional examples of useful non-fluorinated polymers, as noted above, include polyesters, polycarbonates, polyketones, and polyureas. Commercially available examples of such polymers include SELAR™ polyester (E.I. DuPont de Nemours & Co., Wilmington, Del.), LEXAN™ polycarbonate (General Electric, Pittsfield, Mass.), KADEL™ polyketone (Amoco, Chicago, Ill.), and SPECTRIM™ polyurea (Dow Chemical Co., Midland, Mich.).

The non-fluorinated polymer may also be an elastomer. Examples of useful elastomers include acrylonitrile butadiene (NBR), butadiene rubber, chlorinated and chlorosulfonated polyethylene, chloroprene, ethylene-propylene monomer (EPM) rubber, ethylene-propylene-diene monomer (EPDM) rubber, epichlorohydrin (ECO) rubber, polyisobutylene, polyisoprene, polysulfide, polyurethane, silicone rubber, blends of polyvinyl chloride and NBR, styrene butadiene (SBR) rubber, ethylene-acrylate copolymer rubber, and ethylene-vinyl acetate rubber. Commercially available elastomers include Nipo;l™ 1052 NBR (Zeon Chemical, Louisville, Ky.), Hydrin™ C2000 epichlorohydrin-ethylene oxide rubber (Zeon Chemical, Louisville, Ky.), Hypalon™ 48 chlorosulfonated polyethylene rubber (E.I. DuPont de Nemours & Co., Wilmington, Del.), Nordel™ EPDM (R.T. Vanderbilt Co., Inc., Norwalk, Conn.), Vamac™ ethylene-acrylate elastomer (E.I. DuPont de Nemours & Co., Wilmington, Del.), Krynac™ NBR (Bayer Corp., Pittsburgh, Pa.), Perbunan™ NBR/PVC blend (Bayer Corp., Pittsburgh, Pa.), Therban™ hydrogenated NBR (Bayer Corp. Pittsburgh, Pa.), Zetpol™ hydrogenated NBR (Zeon Chemical, Louisville, Ky.), Santoprene™ thermoplastic elastomer (Advanced Elastomer Systems, Akron, Ohio), and Keltan™ EPDM (DSM Elastomers Americas, Addis, La.).

Any or all of the individual polymer layers in the multi-layer article may further include one or more additives. Examples of useful additives include pigments, plasticizers, tackifiers, fillers, electrically conductive materials (e.g., of the type described in U.S. Pat. No. 5,552,199), electrically insulating materials, stabilizers, antioxidants, lubricants, processing aids, impact modifiers, viscosity modifiers, and combinations thereof.

Figure 2:
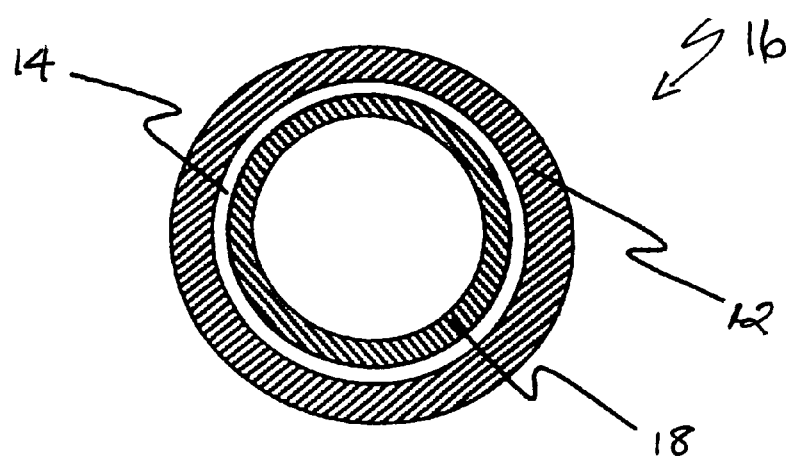

The multi-layer article may be provided in a number of shapes and forms, including a tube, hose, sheet, and the like. FIGS. 1 and 2 depict two embodiments in which the article is in the form of a tube or hose, e.g., a hose suitable for use as a fuel or vapor line in an automobile fuel system. Referring to FIG. 1, there is shown a two-layer article 10 that includes a relatively thick outer layer 12 bonded to a thinner inner layer 14. Outer layer 12 (also known as the "coverstock") is the non-fluorinated polymer layer, as described above, and is designed to provide article 10 with structural integrity. To further enhance structural integrity, reinforcing aids such as fibers, mesh, and/or a wire screen may be incorporated in article 10, e.g., as separate layers or as part of an existing layer. Inner layer 14 (also known as the "barrier") is the VDF-containing fluoroplastic, described above, and acts as a chemical and/or thermal barrier. One or both layers may include an additive to render them electrically conductive.

Multi-layer article 16, shown in FIG. 2, is similar to multi-layer article 10 except that it further includes a flexible polymer layer 18 bonded to barrier layer 14. Suitable materials for polymer layer 18 include fluoroelastomers and non-fluorinated elastomers (e.g., nitrile rubber, epichlorohydrin rubber, and the like). The advantage of including polymer layer 18 is that it improves the sealing properties of the article such as the seal desired when a hose or tube is attached to a rigid connector. Some or all of the layers of the article may include an additive to render them electrically conductive.

The multi-layer article may be produced according to methods known in the art for manufacturing multi-layer articles in general. For example, the fluoroplastic layer and the non-fluorinated polymer layer may be prepared in the form of thin films or sheets and then laminated together under heat and/or pressure to form a bonded multi-layer article. Alternatively, the fluoroplastic and the non-fluorinated polymer, along with additional polymers, can be co-extruded to form a multi-layer article. It is also possible to prepare the individual layers by extrusion coating, e.g., using a crosshead die.

Another useful method for preparing the multi-layer article when the non-fluorinated polymer is an elastomer is described in co-pending, commonly assigned U.S. application Ser. No. 09/,644,731, now abandoned, entitled "Process for Preparing Multi-Layer Articles Having a Fluoroplastic Layer and an Elastomer Layer," which is filed concurrently with the present application and incorporated by reference in its entirety. According to this process, the curable elastomer is extruded in the form of a shaped article and then extrusion coated using a crosshead die with molten fluoroplastic to form the multi-layer article, after which the fluoroplastic layer is heated. Prior to extrusion coating, the curable elastomer is prevented from undergoing substantial heating by means of a polytetrafluoroethylene sleeve affixed within the upstream end of the crosshead die. Following the heating step, the curable elastomer is cured, e.g., by heating it under pressure in an autoclave.

The heat and pressure of the method by which the layers are brought together (e.g. extrusion or lamination) may be sufficient to provide adequate adhesion between the layers. It may, however, be desirable to further treat the resulting article, for example, with additional heat, pressure, or both, to enhance the bond strength between the layers. One way of supplying additional heat when the multi-layer article is prepared by extrusion is by delaying the cooling of the multi-layer article at the conclusion of the extrusion process. Alternatively, additional heat energy may be added to the multi-layer article by laminating or extruding the layers at a temperature higher than necessary for merely processing the components. As another alternative, the finished multi-layer article may be held at an elevated temperature for an extended period of time. For example, the finished article may be placed in a separate apparatus for elevating the temperature of the article such as an oven or heated liquid bath. A combination of these methods may also be used.

Another way of increasing the bond strength between the layers is to treat the surface of one or more of the layers prior to forming the multi-layered article. Such surface treatments may consist of a solution treatment using a solvent. If the solvent contains a base, e.g., 1,8-diaza[5.4.0]bicyclo undec-7-ene (DBU), treatment of the fluoropolymer will result in some degree of dehydrofluorination. Such dehydrofluorination is thought to be beneficial to promote adhesion to subsequently applied materials. This is particularly true when the subsequently applied material contains any agent that is reactive to sites of unsaturation.

Other examples of surface treatments include charged atmosphere treatments such as corona discharge treatment or plasma treatment. Electron beam treatment is also useful.

Interlayer adhesion may also be enhanced using an agent such as an aliphatic di- or polyamine. The amine can be of any molecular weight that, when used, will result in an improvement in the adhesive bond strength between the layers of the multi-layer article. A particularly useful polyamine is polyallylamine having a molecular weight greater than about 1,000, as measured by gel permeation chromatography. An example of a useful commercially available polyamine is polyallyl amine having a molecular weight of about 3,000 available from Nitto Boseki Co., Ltd.

The amine may be incorporated into one or more of the layers of the multi-layer article prior to forming the article using conventional means such as melt-mixing. Alternatively, the amine may be applied to a surface of one or more of the layers using conventional coating methods such as spray coating, curtain coating, immersion coating, dip coating, and the like.

The invention will now be described further by way of the following examples.

EXAMPLES

The fluoroplastics used in the following examples were prepared and polymerized according to the emulsion polymerization methods disclosed in U.S. Pat. No. 4,338,237 examples 1–14 except the monomers and monomer ratios used were as noted in Table 1. Each fluoroplastic was made in the form of a latex that was subsequently coagulated using the methods generally described in U.S. Pat. No. 5,506,281 and U.S. Pat. No. 5,055,539. The resulting solid precipitate was separated, washed a number of times with water, and then dried at 120° C. in vacuo to yield the fluoroplastic.

Examples 1–4 and Comparative Examples C-1 and C-2

Five fluoroplastic polymers were prepared following the above-described procedure. The composition of each polymer is set forth in Table 1. For the sake of convenience, the various fluoroplastics are designated Fluoroplastics A–D in Table 1. The melting temperature of each fluoroplastic was measured by Differential Scanning Calorimetry using a Pyris 1 apparatus available from Perkin Elmer. The values reported in Table 1 represent the peak of the DSC curve.

Fluoroplastic films, each having a thickness of about 250 microns, were prepared by placing the fluoroplastic composition in a Wabash Hydraulic Press set at 250° C. for a period of 3 minutes. Each film was cut into a disc having a diameter of 7.72 cm (3 in.) and used for permeation testing. Permeation constants reported in Table 1 were obtained using the procedure described in ASTM D 814-86 (Reapproved 1991) with the following changes or specifics: The glass jar of ASTM 814 was replaced with a Thwing Albert Vapometer Permeability Cup as described in ASTM 96; the gaskets used were made of Dyneon FE-5840Q elastomer instead of neoprene and were located on both the top and bottom of the test specimen; a circular disk of mesh schreen was used on top of the gasket to prevent the test specimen from deforming during the test; the test liquid was 100 ml of CE 10 fuel (10% ethanol, 45% iso-octane, 45% toluene); and the test temperature was 60° C. The permeation constant was calculated by measuring the weight loss each day for a two-week period. The slope of the line obtained by plotting cumulative weight loss v. days was divided by the area of the test specimen and multiplied by its thickness.

For the sake of comparison, the permeation constants of two fluoroplastics commercially available from Dyneon LLC, St. Paul, Minn. under the designations "THV 500" and "THV 610X" were also measured. These values are also reported in Table 1.

The results shown in Table 1 demonstrate that fluoroplastic films having a melting temperature of at least 200° C. and a VDF content of less than 20 wt. % exhibit good permeation resistance.

Example 5

A cross-head die was used to coat Fluoroplastic A (Table 1) onto an extruded nitrile rubber tube having an inside diameter of about 32 mm. The fluoroplastic-coated nitrile rubber tube was then covered with nitrile rubber using a rubber extruder with a cross-head die, after which a fiber reinforcement layer was applied to the construction using a knitting machine. A final coverstock layer was extruded over the fiber reinforcement layer using a rubber extruder with a cross-head die. The resulting multi-layer hose was then cooled and cut into curing samples. The samples were placed on a steel mandrel and thermally cured at a temperature of 160° C. and a pressure of 0.4 MPa for 40 minutes using steam in an autoclave. Following cure, the samples were removed from the autoclave and cooled to room temperature.

The cured hose samples were cut to 315 mm length hoses for use in permeation testing. For permeation measurements, metal plugs, with a diameter providing for about 7% expansion of the hose, were used to plug both ends of the hose. The plugs were then clamped with a screw-driven band. One of the plugs on each sample test hose was fitted with 6.35 mm threaded plugs to allow the filling of the hoses with CE 10 fuel (10% ethanol, 45% iso-octane, 45% toluene) and then screwed down tightly to form a leak-proof seal. The hoses were allowed to soak with the fuel for a 6 week period at 60° C. to allow conditioning of the samples with the fuel.

The permeation rate was measured using micro-SHED (micro-Sealed Housing for Evaporative Determination), which is designed to measure hydrocarbon emissions from a small component in the fuel system using a flame ionization detector (FID). Details of the micro-SHED test procedure and apparatus are described in Anders Aronsson and Marika Mannikko, "Micro SHED," SAE Technical Paper No. 980402 (1998). The sample tubes were refreshed with fresh CE 10 fuel 6 to 18 hours before running the SHED test. During the SHED test, the samples were vented through the fill plug to the outside of the SHED apparatus to minimize any effect of pressure. The temperature for the SHED test was set at 60° C. The results are shown in Table 2.

Example 6

The procedure of Example 5 was followed except that Fluoroplastic B (Table 1) was used instead of Fluoroplastic A. The results are shown in Table 2.

Comparative Example C-3

The procedure of Example 5 was followed except that THV-500 was used instead of Fluoroplastic A. The results are shown in Table 2. The results demonstrate that multi-layer articles prepared using a fluoroplastic having a melting temperature of at least 200° C. and a VDF content of less than 20 wt. % exhibit good permeation resistance.

TABLE 1

| Ex. | Fluoroplastics | Melting point (° C.) | Monomer composition, wt % | | | | | Permeation constant (g·mm/m²·day) |
| --- | --- | --- | --- | --- | --- | --- | --- | --- |
| | | | TFE | HFP | VDF | PPVE | E | |
| 1 | Fluoroplastic A | 205 | 68 | 14 | 18 | — | — | 4.6 |
| 2 | Fluoroplastic B | 233 | 76 | 13 | 11 | — | — | 2.3 |
| 3 | Fluoroplastic C | 231 | 74 | 11 | 13 | 2 | — | 2.7 |
| 4 | Fluoroplastic D | 205 | 64 | 20 | 4 | — | 16 | 8.8 |
| C-1 | THV X610 | 185 | 65 | 16 | 19 | — | — | 5.4 |
| C-2 | THV-500 | 160 | 59 | 19 | 22 | — | — | 11.9 |

TFE: tetrafluoroethylene, HFP: hexafluoropropylene, VDF: vinylidene fluoride
PPVE: perfluropropyl vinyl ether, E: ethylene

TABLE 2

| Example | Fluroplastic | VDF content (wt %) | Permeation rate (mg/day) |
| --- | --- | --- | --- |
| 5 | Fluoroplastic A | 18 | 706 |
| 6 | Fluoroplastic B | 13 | 453 |
| C-3 | THV-500 | 22 | 1857 |

Example 7

A 1 wt. % solution of polyallylamine (PAA, CAS number [30551-89-4]) was made by dissolving 50 g of PAA 10C (10% PAA aqueous solution, molecular weight 10,000) available from Nitto Boseki Co., (Tokyo, Japan) in 450 g of 2-propanol. Using a spray coater, the solution was coated onto an extruded tube of a curable fluoroelastomer having the following composition: 100 parts Dyneon FE-5830Q fluoroelastomer (Dyneon LLC, St. Paul, Minn.); 12 parts N-990 carbon black (Cabot Corp., Alpharetta, Ga.); 10 parts Vulcan XC-72 conductive carbon black (Cabot Corp., Alpharetta, Ga.); 6 parts calcium hydroxide HP (C.P. Hall, Chicago, Ill.); 9 parts magnesium oxide (commercially available from Morton International, Danvers, Mass., under the designation "Elastomag™ 170:); 4 parts calcium oxide HP (C.P. Hall, Chicago, Ill.); and 0.5 parts Camaba wax (Taber Inc., Barrington, Ga.). The fluoroelastomer tubing had an outer diameter of 12 mm with a wall thickness of 0.33 mm:

Fluoroplastic B (Table 1) was extruded onto the PAA-coated tube of fluoroelastomer using a cross-head die. The fluoroplastic-coated rubber tube was cooled and cut into curing samples. The samples were placed on a steel mandrel and thermally cured at a temperature of 155° C. and a pressure of 0.4 MPa for 60 minutes using steam in an autoclave. Following cure, the samples were removed from the autoclave and cooled to room temperature.

The peel adhesion of the cured samples was evaluated by making a cut to separate a 7 mm wide strip of the fluoroplastic outer layer from the fluroelastomer core in order to provide a tab for adhesion testing. An Instron® Model 1125 tester, available from Instron Corp., set at a 100 mm/min. crosshead speed, was used as the test device. Peel strength between the fluoroplastic and fluoroelastomer layers was measured in accordance with ASTM D 1876 (T-Peel Test) with the exception that the peel angle was 90 degrees. The average value is reported in Table 3.

The surface resistivity of this hose sample was also measured and determined according to ASTM D257 to be $9.6 \times 10^4$ ohm/square using resistance meter model 872A, available from Electro-tech System Inc.

Example 8

The procedure of Example 7 was followed except that the polyallylamine was a 1% solution was made by dissolving 25 g of PAA-EtOH (20% PAA ethanol solution, molecular weight; 3,000) available from Nitto Boseki Co. in 475 g of 2-propanol. The test results are shown in Table 3.

Example 9

The procedure of Example 7 was followed except that the PAA coating was eliminated. The results are shown in Table 3. The results demonstrate that the use of a PAA coating enhances interlayer adhesion.

TABLE 3

| Examples | Inside layer | Coating layer/M.W. | | Outside layer | Peel strength (N/cm) |
|---|---|---|---|---|---|
| 7 | FKM | PAA 10C | 10,000 | Fluoroplastic B | 9.5 |
| 8 | FKM | PAA EtOH | 3,000 | Fluoroplastic B | 22.3 |
| 9 | FKM | — | — | Fluoroplastic B | 4.4 |

FKM = Fluoroelastomer.

A number of embodiments of the invention have been described. Nevertheless, it will be understood that various modifications may be made without departing from the spirit and scope of the invention. Accordingly, other embodiments are within the scope of the following claims.

What is claimed is:

1. A multi-layer article comprising (A) a first polymer layer comprising a fluoroplastic having a uni-modal molecular weight distribution and a melting point of at least 200° C. that includes interpolymerized units derived from vinylidene fluoride and tetrafluoroethylene in which the amount of vinylidene fluoride units is at least 0.1% by weight but less than 20% by weight, wherein said first polymer layer is a fluoroplastic layer, and (B) a second polymer layer bonded to said first polymer layer comprising a non-fluorinated polymer.

2. A multi-layer article according to claim 1 wherein the amount of vinylidene fluoride units is at least 3% by weight but less than 20% by weight.

3. A multi-layer article according to claim 1 wherein the amount of vinylidene fluoride units is between 3 and 15% by weight.

4. A multi-layer article according to claim 1 wherein the amount of vinylidene fluoride units is between 10 and 15% by weight.

5. A multi-layer article according to claim 1 wherein said fluoroplastic further comprises interpolymerized units derived from hexafluoropropylene.

6. A multi-layer article according to claim 1 wherein said fluoroplastic further comprises interpolymerized units derived from a vinyl ether monomer selected from the group consisting of perfluorinated alkoxy vinyl ether monomers, perfluorinated alkyl vinyl ether monomers, and combinations thereof.

7. A multi-layer article according to claim 6 wherein the amount of units derived from said vinyl ether monomer is between 0.1 and 5% by weight.

8. A multi-layer article according to claim 1 wherein said fluoroplastic consists essentially of interpolymerized units derived from vinylidene fluoride, tetrafluoroethylene, and hexafluoropropylene in which the amount of vinylidene fluoride units is between 10 and 15% by weight.

9. A multi-layer article according to claim 5 wherein said fluoroplastic includes interpolymerized units derived from 0.1–15% by weight vinylidene fluoride, 60–85% by weight tetrafluoroethylene, and 10–30% by weight hexafluoropropylene.

10. A multi-layer article according to claim 1 wherein said non-fluorinated polymer comprises an elastomer.

11. A multi-layer article according to claim 10 wherein said elastomer is a thermoplastic elastomer.

12. A multi-layer article according to claim 10 wherein said elastomer is selected from the group consisting of nitrile rubbers, ethylene-propylene-diene monomer rubbers, epichlorohydrin rubbers, ethylene-acrylate copolymer rubbers, and combinations thereof.

13. A multi-layer article according to claim 1 wherein said non-fluorinated polymer comprises a thermoplastic polymer.

14. A multi-layer article according to claim 13 wherein said thermoplastic polymer is selected from the group consisting of polyamides, polyurethanes, polyolefins, and combinations thereof.

15. A multi-layer article according to claim 1 wherein the adhesion between said first and second polymer layers is at least 5 N/cm.

16. A multi-layer article according to claim 1 wherein the adhesion between said first and second polymer layers is at least 15 N/cm.

17. A multi-layer article according to claim 1 further comprising a bonding layer interposed between said first and second polymer layers.

18. A multi-layer article according to claim 17 wherein said bonding layer comprises a polyamine.

19. A multi-layer article according to claim 18 wherein said polyamine comprises polyallylamine.

20. A multi-layer article according to claim 19 wherein said polyallylamine has a molecular weight greater than 1,000.

21. A multi-layer article according to claim 1 further comprising a third polymer layer bonded to said first polymer layer such that said first polymer layer is interposed between said second and third polymer layers.

22. A multi-layer article according to claim 21 wherein said third polymer layer is bonded directly to said first polymer layer.

23. A multi-layer article according to claim 21 further comprising a bonding layer interposed between said first and third polymer layers.

24. A multi-layer article according to claim 21 wherein said third polymer layer comprises an elastomer.

25. A multi-layer article according to claim 24 wherein said elastomer comprises a fluoroelastomer.

26. A multi-layer article according to claim 24 wherein said elastomer comprises a non-fluorinated elastomer.

27. A multi-layer article according to claim 26 wherein said non-fluorinated elastomer is selected from the group consisting of nitrile rubbers, ethylene-propylene-diene monomer rubbers epichlorohydrin rubbers, ethylene-acrylate copolymer rubbers, and combinations thereof.

28. A multi-layer article according to claim 1 wherein said first polymer layer is electrically conductive.

29. A multi-layer article according to claim 21 wherein said third polymer layer is electrically conductive.

30. A multi-layer article according to claim 1 wherein said article is in the form of a sheet.

31. A multi-layer article according to claim 1 wherein said article is in the form of a hose.

32. A multi-layer article comprising (A) a first polymer layer comprising a fluoroplastic that includes interpolymerized units derived from vinylidene fluoride and tetrafluoroethylene in which the amount of vinylidene fluoride units is between 0.1 and 15% by weight, said fluoroplastic having a uni-modal molecular weight distribution, wherein said first polymer layer is a fluoroplastic layer, and (B) a second polymer layer bonded to said first polymer layer comprising a non-fluorinated polymer.

33. A multi-layer article according to claim 32 wherein the amount of vinylidene fluoride units is between 3 and 15% by weight.

34. A multi-layer article comprising (A) a first fluoroplastic polymer layer having a uni-modal molecular weight distribution and a melting point of at least 200° C. that comprises a fluoroplastic having interpolymerized units derived from vinylidene fluoride and tetrafluoroethylene in which the amount of vinylidene fluoride units is at least 0.1% by weight but less than 20% by weight, and (B) a second polymer layer bonded to said first polymer layer comprising a non-fluorinated polymer.

35. A multi-layer article comprising (A) a first layer that consists essentially of a fluoroplastic polymer having a uni-modal molecular weight distribution and a melting point of at least 200° C. that includes interpolymerized units derived from vinylidene fluoride and tetrafluoroethylene in which the amount of vinylidene fluoride units is at least 0.1% by weight and less than 20% by weight, wherein said first polymer layer is a fluoroplastic layer, and (B) a second polymer layer bonded to said first polymer layer, said second polymer layer comprising a non-fluorinated polymer.

36. A multi-layer article comprising (A) a first polymer layer comprising a fluoroplastic having a uni-modal molecular weight distribution and a melting point of at least 200° C. that includes interpolymerized units derived from vinylidene fluoride and tetrafluoroethylene in which the amount of vinylidene fluoride units is at least 0.1% by weight but less than 20% by weight, wherein said first polymer layer is a fluoroplastic layer, and (B) a second polymer layer bonded to said first polymer layer comprising a non-fluorinated polymer, further comprising a bonding layer comprising a polyamine having a molecular weight of greater than 1000 between said first and second polymer layers.

37. A multi-layer article according to claim 5 wherein said fluoroplastic further comprises interpolymerized units derived from a vinyl ether monomer selected from the group consisting of perfluorinated alkoxy vinyl ether monomers, perfluorinated alkyl vinyl ether monomers, and combinations thereof.

* * * * *